United States Patent
Kamoi et al.

(10) Patent No.: US 10,421,193 B2
(45) Date of Patent: Sep. 24, 2019

(54) ROBOT SYSTEM

(71) Applicant: FANUC CORPORATION, Yamanashi (JP)

(72) Inventors: Toshiaki Kamoi, Yamanashi (JP); Tomoyuki Yamamoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 41 days.

(21) Appl. No.: 15/833,434

(22) Filed: Dec. 6, 2017

(65) Prior Publication Data

US 2018/0161988 A1    Jun. 14, 2018

(30) Foreign Application Priority Data

Dec. 8, 2016  (JP) .................................. 2016-328536

(51) Int. Cl.
 B25J 13/00   (2006.01)
 B25J 9/16    (2006.01)
 (Continued)

(52) U.S. Cl.
 CPC .............. B25J 13/085 (2013.01); B25J 9/16 (2013.01); B25J 9/1664 (2013.01); B25J 9/1666 (2013.01);
 (Continued)

(58) Field of Classification Search
 CPC . B25J 13/085; B25J 9/16; B25J 9/1666; B25J 9/1694; B25J 13/006; B25J 9/1676;
 (Continued)

(56) References Cited

U.S. PATENT DOCUMENTS 5,400,244 A * 3/1995 Watanabe ............ G05D 1/0242
                                                          180/404
5,920,678 A   7/1999 Watanabe et al.
(Continued)

FOREIGN PATENT DOCUMENTS

CN    101769754    7/2010
CN    103576686    2/2014
(Continued)

OTHER PUBLICATIONS

Office Action dated Jul. 3, 2018 in Japanese Application No. 2016-238536.
(Continued)

*Primary Examiner* — Jason Holloway
(74) *Attorney, Agent, or Firm* — Wenderoth, Lind & Ponack, L.L.P.

(57) ABSTRACT

To provide a robot system capable of reducing the burden of a setting operator regardless of conditions such as setting conditions of a robot and the complexity of a work space at the time of setting an operable-inoperable area of the robot. A robot system has a robot capable of detecting contact with an obstacle. The robot moves inside a predetermined search area in a predetermined posture along a previously-determined scheduled search route and sets an operable-inoperable area of the robot inside the search area based on position-posture data with respect to the robot having come into contact with the obstacle during moving of the robot.

4 Claims, 7 Drawing Sheets (51) Int. Cl.
*B25J 13/08* (2006.01)
*G05B 19/406* (2006.01)

(52) U.S. Cl.
CPC ............ *B25J 9/1676* (2013.01); *B25J 13/08* (2013.01); *B25J 9/1694* (2013.01); *B25J 13/006* (2013.01); *G05B 19/406* (2013.01); *G05B 2219/39135* (2013.01); *G05B 2219/40202* (2013.01); *G05B 2219/40497* (2013.01); *Y10S 901/46* (2013.01)

(58) Field of Classification Search
CPC . B25J 5/007; B25J 9/1664; B25J 13/08; B25J 5/00; G05B 2219/40202; G05B 2219/40497; G05B 2219/39135; G05B 19/406; Y10S 901/46; G05D 1/0227; G05D 1/0274; G05D 1/0027
See application file for complete search history.

(56) References Cited

U.S. PATENT DOCUMENTS

| | | | |
|---|---|---|---|
| 6,429,617 B1 | 8/2002 | Sano et al. | |
| 7,638,090 B2* | 12/2009 | Hyde | A61L 2/07 422/3 |
| 8,364,309 B1* | 1/2013 | Bailey | G06N 3/008 700/245 |
| 8,606,401 B2* | 12/2013 | Ozick | A47L 5/30 700/253 |
| 8,930,009 B2* | 1/2015 | Miyoshi | B25J 9/1679 700/112 |
| 10,131,053 B1* | 11/2018 | Sampedro | B25J 9/1666 |
| 10,300,601 B2* | 5/2019 | Tan | B25J 9/16 |
| 2003/0212472 A1* | 11/2003 | McKee | G05D 1/0274 700/245 |
| 2008/0091304 A1* | 4/2008 | Ozick | A47L 5/30 700/258 |
| 2009/0326711 A1* | 12/2009 | Chang | B25J 9/1666 700/248 |
| 2014/0067121 A1* | 3/2014 | Brooks | B25J 9/1676 700/255 |
| 2015/0375393 A1* | 12/2015 | Oda | B25J 9/1664 700/98 |
| 2016/0354931 A1* | 12/2016 | Jones | G05D 1/0219 |
| 2017/0274532 A1* | 9/2017 | Nishitani | B25J 9/1671 |
| 2018/0304472 A1* | 10/2018 | Angle | H04L 12/282 |
| 2018/0370035 A1* | 12/2018 | Sussman | B25J 19/06 |

FOREIGN PATENT DOCUMENTS

| | | |
|---|---|---|
| CN | 104407616 | 3/2015 |
| DE | 10 2008 024 950 | 11/2009 |
| DE | 10 2016 003 250 | 9/2016 |
| JP | 61-131001 | 6/1986 |
| JP | 5-297920 | 11/1993 |
| JP | 11-170186 | 6/1999 |
| JP | 2006-102922 | 4/2006 |
| JP | 2011-189430 | 9/2011 |
| WO | 2013-018908 | 2/2013 |

OTHER PUBLICATIONS

Office Action dated Jan. 15, 2019 in German Application No. 102017222057.0.

Office Action issued Mar. 12, 2019 in Chinese Patent Application No. 201711330110.4.

* cited by examiner

OPERABLE AREA
 STARTING POINT:X:0mm Y:0mm
 END POINT:X:1000mm Y:400mm

OPERATION RESTRICTED AREA
 STARTING POINT:X:800mm Y:0mm
 END POINT:X:850mm Y:200mm

APPLY SETTINGS FOR THE OPERABLE
 -INOPERABLE AREA?
         YES   NO

ROBOT SYSTEM

This application is based on and claims the benefit of priority from Japanese Patent Application No. 2016-238536, filed on 8 Dec. 2016, the content of which is incorporated herein by reference.

BACKGROUND OF THE INVENTION

Field of the Invention

The present invention relates to a robot system having one or more robots such as industrial robots.

Related Art

Lately, collaborative robots (coordinated robots) which detect contact with a human being and/or a peripheral device by use of a force sensor and stop or change their operation so as to be able to perform operations while sharing a work space with a human being such as a worker have become widespread. In these collaborative robots, it is important to appropriately set an operable-inoperable area (an operable area and an operation restricted area) of the robots in order to enhance safety during work. Conventionally, when setting such an operable-inoperable area, a setting operator sets numerical values (for example, an X coordinate and a Y coordinate in the case of a two dimensional work space, or an X coordinate, a Y coordinate and a Z coordinate in the case of a three dimensional work space), while estimating the operation restricted area (interference area) of the robot.

As for a machine tool, in a disclosed technology for preventing collision (interference) between a chuck and a tool or between a workpiece and a tool, an interference area is set in a manner that after a dedicated contact sensor (touch probe, tool setter) is attached to a tool post or a spindle side, an interference area is obtained based on a position (coordinates) at the time of contact of a workpiece with a chuck or another workpiece (refer to Patent Document 1 as an example).

Patent Document 1: Japanese Unexamined Patent Application, Publication No. 2006-102922

SUMMARY OF THE INVENTION

However, according to the conventional method in which the setting operator inputs numerical values to set the operable-inoperable area of the robot, a large amount of inputting work may be required in some cases, depending on the setting conditions of the robot. In addition, in the case of a complicated work space, it becomes difficult to appropriately set the operable-inoperable area of the robot. As a result, at the time of setting the operable-inoperable area of the robot, a burden on the setting operator inevitably increases.

Further, the technology relating to a machine tool disclosed in Patent Document 1 belongs to a different technical field from a robot system in the first place, and is cumbersome since it requires a dedicated contact sensor to be attached.

Taking into consideration the above circumstances, the object of the present invention is to provide a robot system capable of reducing a burden on a setting operator, regardless of conditions such as setting conditions of a robot and the complexity of a work space at the time of setting an operable-inoperable area of the robot.

(1) A robot system (for example, a robot system 1, which is described below) according to the present invention has a robot (for example, a robot 3, which is described below) capable of detecting contact with an object (for example, an obstacle 2, which is described below). The robot moves inside a predetermined search area (for example, a search area 5, which is described below) in a predetermined posture and sets an operable-inoperable area (for example, an operable area 5a and an operation restricted area 5b, which are described below) of the robot inside the search area based on position-posture data with respect to the robot having come into contact with the object during moving of the robot.

(2) In the robot system according to (1), the robot may specify which part of a mechanical portion of the robot has come into contact with the object.

(3) In the robot system according to (1) or (2), the robot may move along a previously-determined scheduled search route (for example, a scheduled search route 6, which is described below) when moving inside the search area.

(4) In the robot system according to (3), the robot may change the scheduled search route upon contact with the object.

(5) In the robot system according to any one of (1) to (4), when the operable-inoperable area is set, the operable-inoperable area may be indicated on a display device (for example, a display device 7, which is described below) so that whether to make the operable-inoperable area effective becomes selectable.

A robot system (for example, a robot system 1, which is described below) according to the present invention includes at least a first robot (for example, a robot 3A, which is described below) and a second robot (for example, a second robot 3B, which is described below). Either one of the first robot and the second robot moves inside a predetermined search area (for example, a search area 5, which is described below) in a predetermined posture, and sets an operable-inoperable area (for example, an operable area 5a and an operation restricted area 5b, which are described below) of the one robot inside the search area, based on position-posture data with respect to the one robot having come into contact with an object (for example, obstacle 2, which is described below) during moving of the one robot. In addition, the other of the first robot and the second robot sets the operable-inoperable area of the other robot inside the search area through calculation, by using relative position-angle data against the one robot, based on the operable-inoperable area set by the one robot.

A robot system (for example, a robot system 1, which is described below) according to the present invention includes at least a first robot (for example, a robot 3A, which is described below) and a second robot (for example, a robot 3B, which is described below). The first robot and the second robot are communicatively connected to each other via a network and are capable of detecting each other's position-posture-angle data in real time. The first robot and the second robot move respectively inside a predetermined search area (for example, a search area 5, which is described below) in a predetermined posture, store the mutual position-posture-angle data with respect to the robots through real-time communication via the network when the robots have come into contact with each other during moving of the robots, and set the operable-inoperable areas for each of the robots inside the search area based on the mutual position-posture-angle data of the robots.

According to the present invention, the operable-inoperable area of the robot can be automatically set inside the predetermined search area upon the contact of the robot with the object. Accordingly, this enables to reduce the burden on the setting operator regardless of conditions such as setting conditions of the robot and complexity of a work space, at the time of setting of the operable-inoperable area of the robot.

DETAILED DESCRIPTION OF THE INVENTION

The first embodiment of the present invention is described below with reference to the drawings. It is noted that, in the description of the second embodiment and its subsequent embodiments, the same reference numerals are given to the configurations common to those of the first embodiment, and the description thereof is omitted.

First Embodiment

Figure 1:
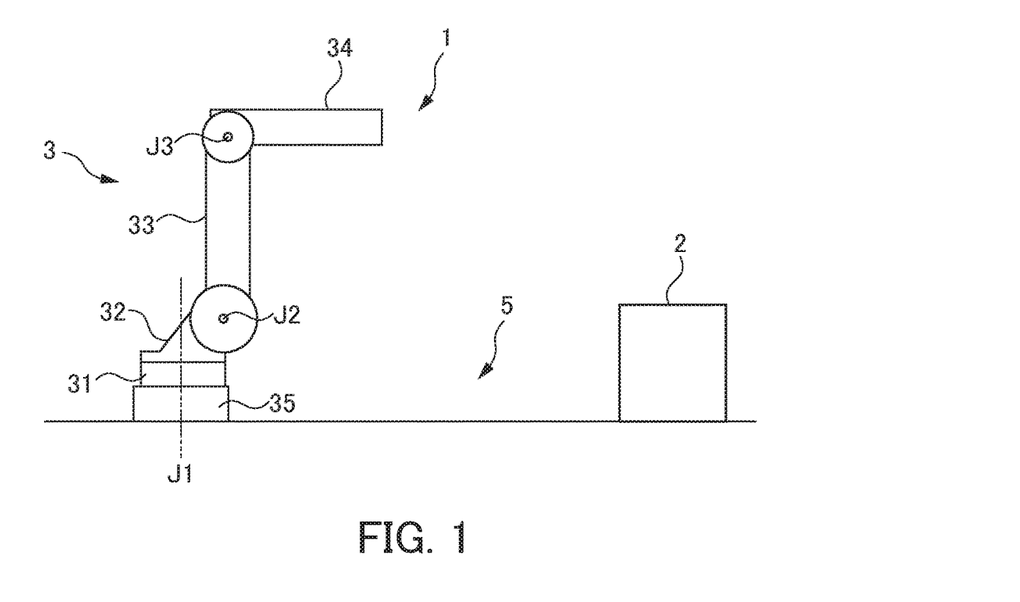
FIG. 1 is a front view illustrating a robot system according to a first embodiment of the present invention.
Figure 5:
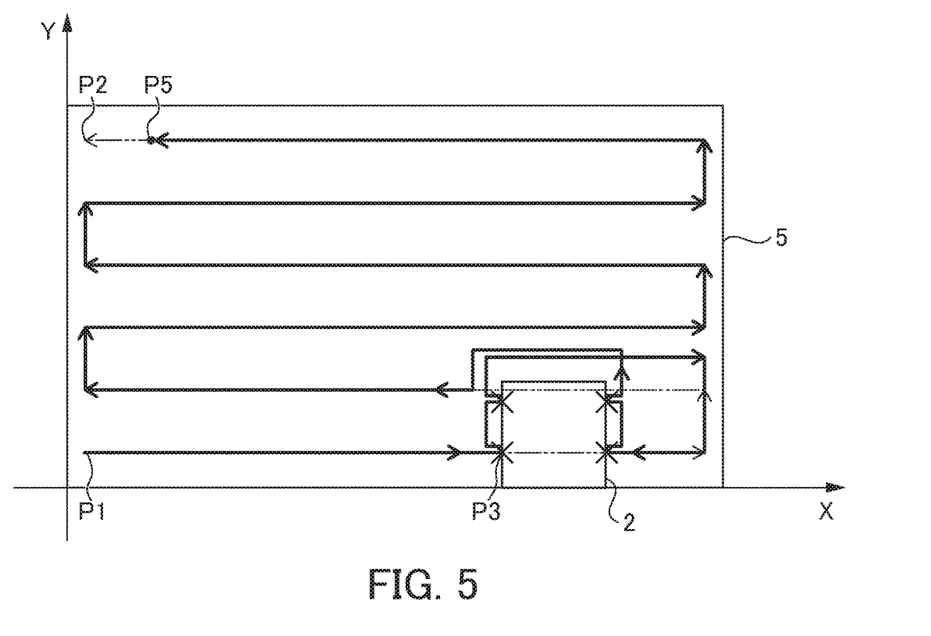
FIG. 5 is a plan view illustrating a final search route of the robot in the robot system according to the first embodiment of the present invention.
Figure 6:
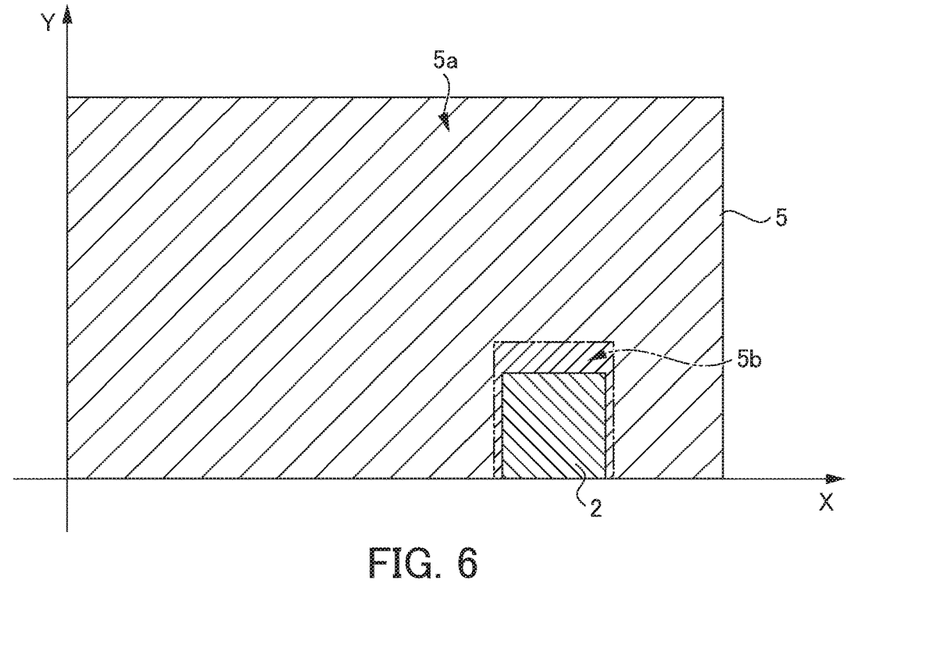
FIG. 6 is a plan view illustrating an operable-inoperable area of the robot in the robot system according to the first embodiment of the present invention.
Figure 7:
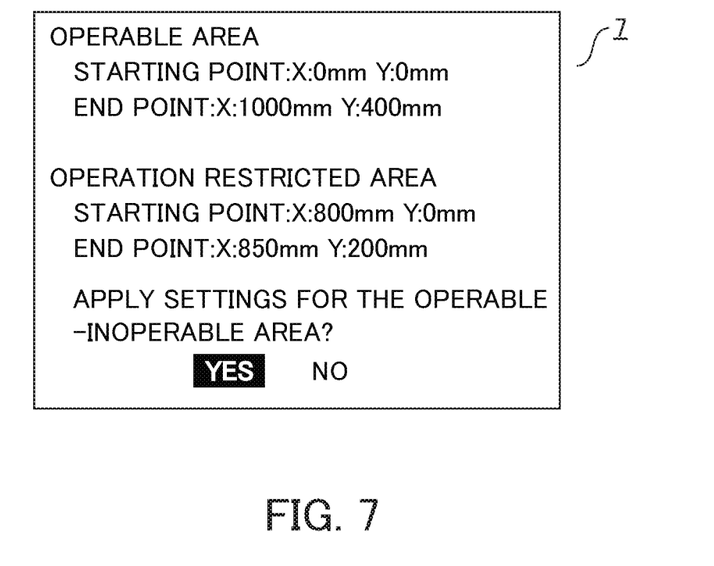
FIG. 7 is a screen view indicating the operable-inoperable area of the robot in numerical values in the robot system according to the first embodiment of the present invention.

FIG. 1 is a front view illustrating a robot system according to the first embodiment. FIGS. 2 to 6 are plan views illustrating a procedure for setting an operable-inoperable area of a robot in the robot system according to the first embodiment. FIG. 7 is a screen view indicating the operable-inoperable area of the robot in numerical values in the robot system according to the first embodiment.

As shown in FIG. 1, a robot system 1 according to the first embodiment has a vertical articulated robot 3 capable of detecting contact with an obstacle 2 as a non-moving object in a predetermined search area 5.

The robot 3 has a base portion 31, a rotary barrel 32 attached to the upper side of the base portion 31 so as to be rotatable around a first axis J1, an upper arm 33 attached to the rotary barrel 32 so as to be rotatable around a second axis J2, and a forearm 34 provided on the top of the upper arm 33 so as to be rotatable around a third axis J3. It is noted that the operation of the robot 3 is enabled to be controlled by a controller (not shown in the figure) connected to the robot 3.

The robot 3 has a 6-axis force sensor 35 attached to the lower side of the base portion 31, and is capable of, by the 6-axis force sensor 35, specifying which part of a mechanical portion thereof has come into contact with the obstacle 2 through calculation. That is, forces (FX, FY, FZ) in the three axes (X axis, Y axis, Z axis) are first projected to the second axis J2, and a force F2 along the axis J2 is obtained. Then, a moment M2 around an outer product vector of a J1 axis vector and a J2 axis vector is obtained from moments (MX, MY, MZ) in the three axes. The value obtained by dividing the moment M2 by the force F2 (through calculation of M2/F2) corresponds to a height of an action point of a force. Thus, an action position (contact portion) of an external force can be specified (calculated).

In the robot system 1, at the time of setting the operable-inoperable area of the robot 3 inside the search area 5, the robot 3 moves, based on a program, inside the predetermined search area 5 with a constant pitch in a predetermined posture along a scheduled search route 6 which has been determined in advance, and then sets the operable-inoperable area of the robot 3 inside the search area 5 based on position-posture data with respect to the robot 3 having come into contact with the obstacle 2 during moving of the robot 3.

Figure 2:
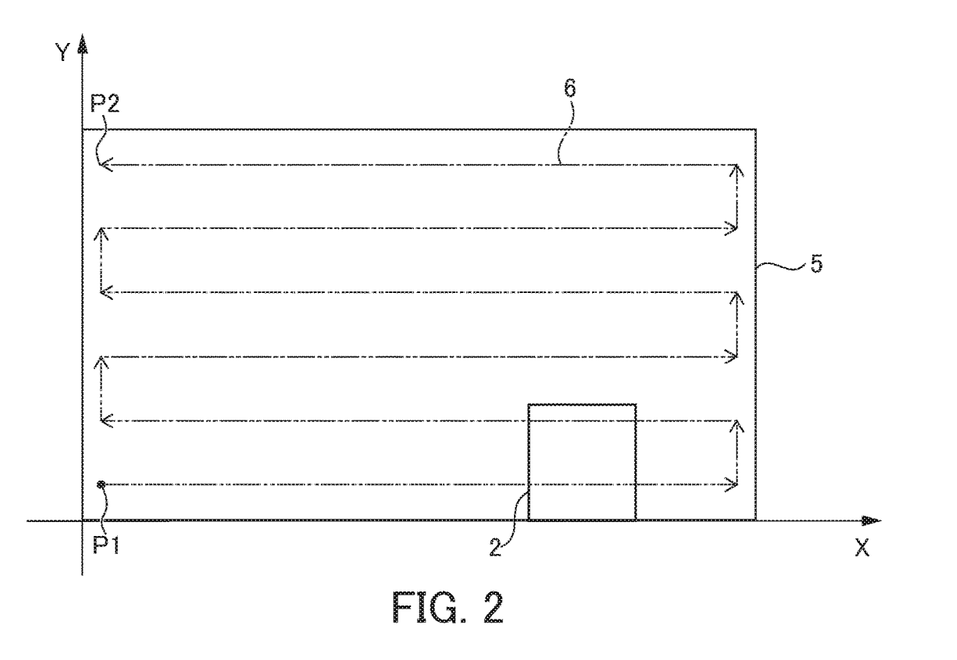
FIG. 2 is a plan view illustrating a search area and a scheduled search route of a robot in the robot system according to the first embodiment of the present invention.

A specific procedure for setting the operable-inoperable area of the robot 3 is described below with respect to an exemplary case where, as shown in FIG. 2, the search area 5 has a rectangle shape (two-dimensional shape) and the scheduled search route 6 of the robot 3 is formed in a lightning (zigzag) shape.

First, in a state where the robot 3 is set at a starting point P1, the robot system 1 sets the scheduled search route 6 in a lightning shape starting from the starting point P1 to a destination point P2 inside the rectangle-shaped search area 5, as shown by the two-dot chain line in FIG. 2.

Figure 3:
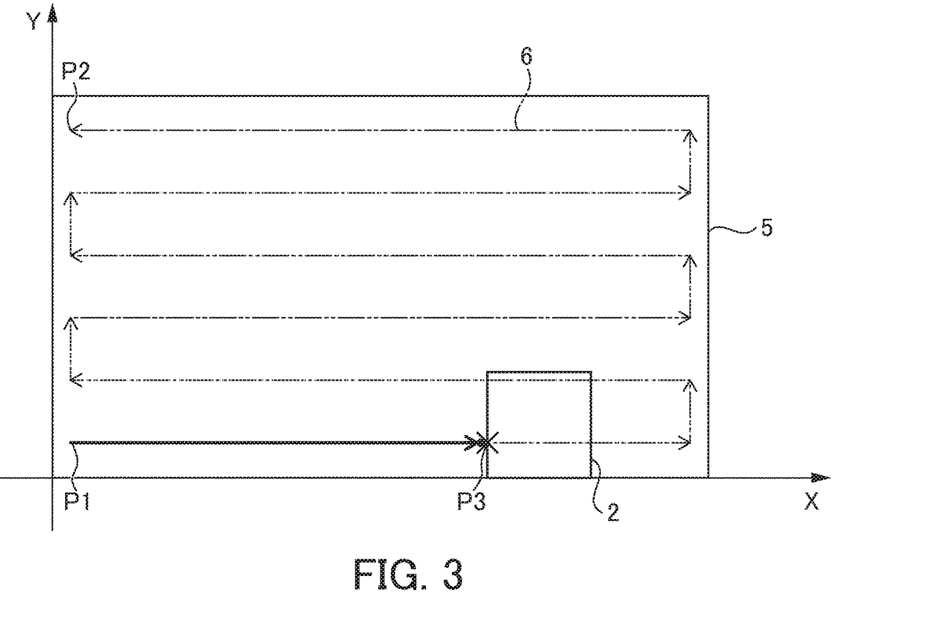
FIG. 3 is a plan view illustrating a state where the robot has come into contact with an obstacle in the robot system according to the first embodiment of the present invention.

Then, the robot 3 moves from the starting point P1 along the scheduled search route 6 in the positive direction of the X axis (to the right in FIG. 3). At this time, since there is the obstacle 2 ahead of the robot 3 in the moving direction, the robot 3 comes into contact with the obstacle 2 during moving. The position of the robot 3 at this time is set as a contact point P3, and the position-posture data with respect to the robot 3 at the contact point P3 is stored.

Figure 4:
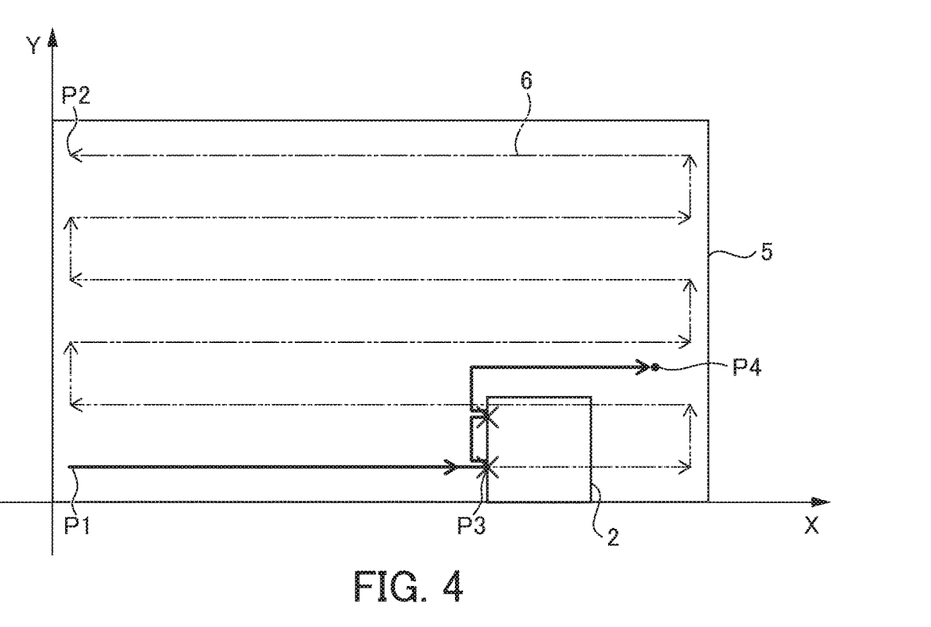
FIG. 4 is a plan view illustrating a state where the search route of the robot is changed in the robot system according to the first embodiment of the present invention.

Then, upon the contact of the robot 3 with the obstacle 2, the scheduled search route 6 is changed, as shown in FIG. 4. The scheduled search route 6 after the change is shifted by a certain distance in the positive direction of Y (upward in FIG. 4) from the contact point P3, then again goes in the positive direction of the X axis (to the right in FIG. 4), and passes through a passing point P4 and the like. Then, the robot 3 moves to the route which it was originally scheduled to take.

Thereafter, each time the robot 3 comes into contact with the obstacle 2, the robot 3 recursively repeats the change of the scheduled search route 6. Therefore, as shown in FIG. 5, the final search route of the robot 3 is set to start from the starting point P1, pass through a passing point P5 after detouring to avoid the obstacle 2, and then arrive to the destination point P2.

Then, based on the position-posture data with respect to the robot 3 having come into contact with the obstacle 2 (the position-posture data with respect to the robot 3 at the contact point P3 and the like), the robot system 1 sets the operable-inoperable area (an operable area 5a and an operation restricted area 5b) of the robot 3 inside the search area 5. As shown in FIG. 6, the search area 5 is divided into two, the operable area 5a and the operation restricted area 5b.

When the operable-inoperable area is set inside the search area 5 in this manner, the operable-inoperable area is indicated in numerical values on a display device 7 such as an operation panel of a liquid crystal display, as shown in FIG. 7. If a setting operator determines that the set contents are acceptable after checking the indication, the setting operator selects "Yes" on the display device 7 so that the set contents are applied. Thereby, the operable-inoperable area becomes effective. On the other hand, if the setting operator determines that the set contents are not acceptable (for example, if finer setting is desired), the setting operator selects "No" on the display device 7 so that the set contents are not applied. Thereby, the operable-inoperable area becomes ineffective.

Then, the setting of the operable-inoperable area of the robot 3 is finished.

As described above, according to the present embodiment, the operable-inoperable area (the operable area 5a and the operation restricted area 5b) of the robot 3 can be automatically set inside the search area 5 upon the contact of the robot 3 with the obstacle 2 in the search area 5. This enables to reduce the burden on the setting operator regardless of conditions such as setting conditions of the robot 3 and the complexity of a work space, at the time of setting of the operable-inoperable area.

Second Embodiment

Figure 8:
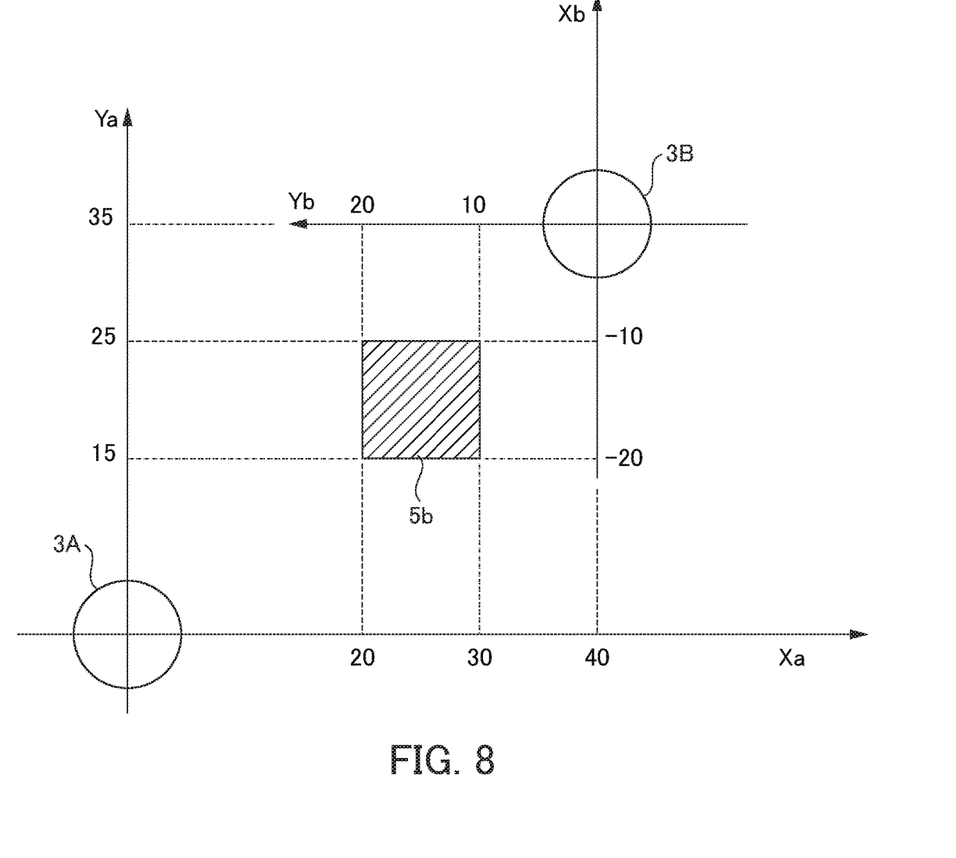
FIG. 8 is a plan view illustrating a robot system according to a second embodiment of the present invention.

FIG. 8 is a plan view illustrating a robot system according to the second embodiment.

As shown in FIG. 8, the robot system 1 according to the second embodiment has two vertical articulated robots 3 (a first robot 3A and a second robot 3B). These robots 3 acquire each other's relative position-angle data (for example, data on coordinate transformation indicating the relation between the coordinate system set for the first robot 3A and the coordinate system set for the second robot 3B), and are communicatively connected to each other via a network.

In this robot system 1, the following procedure is performed at the time of setting the operable-inoperable area of the robots 3 inside the search area 5.

First, the first robot 3A moves, based on a program, inside the predetermined search area 5 with a constant pitch in a predetermined posture along the scheduled search route 6 which has been determined in advance in a lightning shape, and then sets the operable-inoperable area of the first robot 3A inside the search area 5 based on the position-posture data with respect to the first robot 3A having come into contact with the obstacle 2 during moving of the robot 3A.

Thereafter, the second robot 3B acquires the operable-inoperable area set by the first robot 3A through communication via the network. Then, the second robot 3B sets the operable-inoperable area of the second robot 3B inside the search area 5 through calculation by use of the relative position-angle data against the first robot 3A based on the acquired operable-inoperable area (that is, the operable-inoperable area of the first robot 3A).

A specific procedure for setting the operable-inoperable area of the two robots 3 is described below based on FIG. 8. It is assumed that the first robot 3A is set at the origin of XaYa coordinates, while the second robot 3B is set at the origin of XbYb coordinates. Here, XbYb coordinates are obtained through coordinate transformation in such a manner that XaYa coordinates are parallel shifted by +40 in the Xa axis direction and by +35 in the Ya axis direction and the resultant coordinates are rotated by 90° in the counterclockwise direction. Accordingly, the point where the first robot 3A is set corresponds to the point (−35, 40) when viewed in the XbYb coordinates. The point where the second robot 3B is set corresponds to the point (40, 35) when viewed in the XaYa coordinates.

It is assumed that, in the same procedure as in the above-described first embodiment, the operation restricted area 5b of the first robot 3A is set in a square shape having vertexes of two points (20, 15), (30, 25) in the XaYa coordinates. The operation restricted area 5b corresponds to a square shape having vertexes of two points (−10, 10), (−20, 20) in the XbYb coordinates.

Accordingly, as for the first robot 3A, the operation restricted area 5b is set in a square shape having vertexes of two points (20, 15), (30, 25), and the residual area is set as the operable area 5a. On the other hand, as for the second robot 3B, the operation restricted area 5b is set in a square shape having vertexes of two points (−10, 10), (−20, 20), and the remaining area is set as the operable area 5a.

At this time, the operable-inoperable areas of the robots 3 are set for both the first robot 3A and the second robot 3B. Naturally, the areas are different when viewed in different coordinate systems (for example, in the XaYa coordinate system and in the XbYb coordinate system), but are identical when viewed in the same coordinate system (for example, in the XaYa coordinate system).

As described above, according to the present embodiment, the operable-inoperable area (the operable area 5a and the operation restricted area 5b) of the first robot 3A can be automatically set inside the search area 5 upon the contact of the first robot 3A with the obstacle 2. On the other hand, the second robot 3B is capable of setting the operable-inoperable area of the second robot 3B by using the operable-inoperable area set by the first robot 3A without contacting with the obstacle 2. This enables to reduce the burden on the setting operator regardless of conditions such as setting conditions of the two robots 3 and the complexity of a work space, at the time of setting of the operable-inoperable area.

In addition, in the robot system 1, since the two robots 3 are communicatively connected to each other via a network, relative position-angle data can be kept updated through real-time communication via the network, even in cases where each other's relative position-angle data are changed. Accordingly, usability of the robot system 1 is improved.

Third Embodiment

Figure 9A:
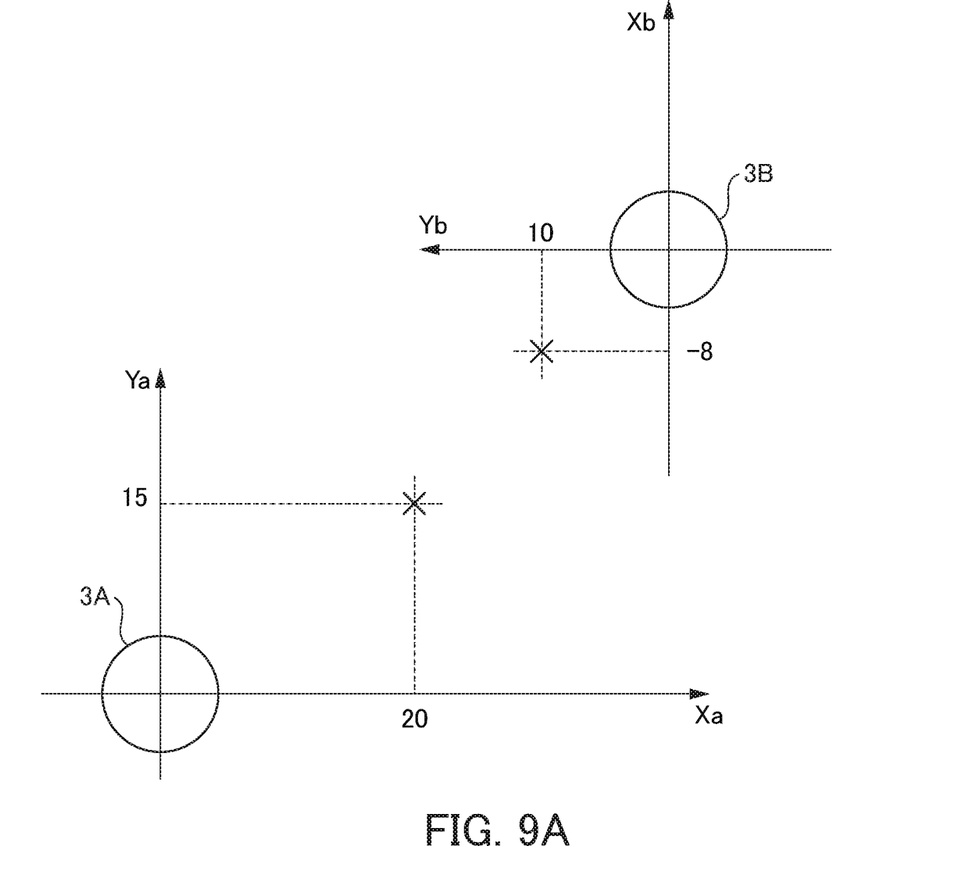
FIG. 9A is a plan view illustrating an example of an operable-inoperable area of a robot in a robot system according to a third embodiment of the present invention.
Figure 9B:
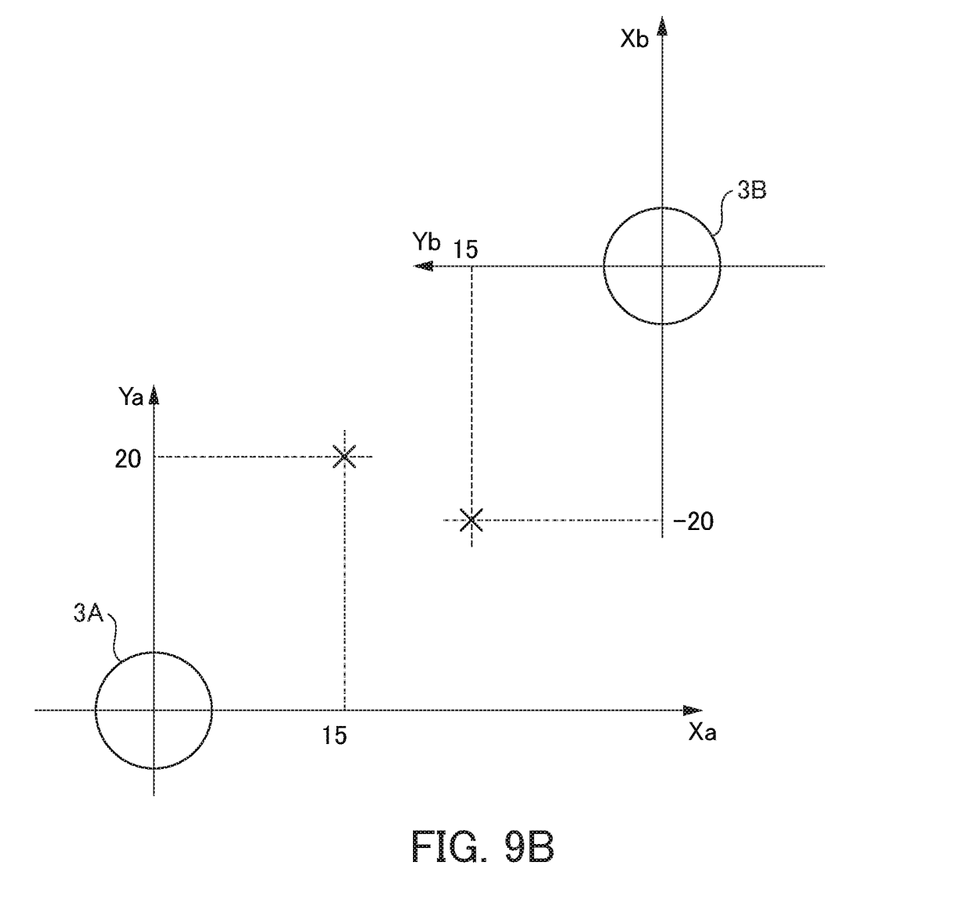
FIG. 9B is a plan view illustrating another example of the operable-inoperable area of the robot in the robot system according to the third embodiment of the present invention.

FIG. 9A is a plan view illustrating an example of the operable-inoperable area of the robot in the robot system according to the third embodiment. FIG. 9B is a plan view illustrating another example of the operable-inoperable area of the robot in the robot system according to the third embodiment.

As shown in FIG. 9A and FIG. 9B, the robot system 1 according to the third embodiment has two vertical articulated robots 3 (the first robot 3A and the second robot 3B). The robots 3 are communicatively connected to each other via a network and are capable of detecting each other's position-posture-angle data in real time. It is noted that the object of the robot system 1 is to prevent interference between the robots 3, not to prevent interference between the robots 3 and the obstacle 2.

In the robot system 1, the following procedure is performed at the time of setting the operable-inoperable area of the two robots 3 inside the search area 5. If either one of the two robots 3 is fixed (if it does not move), the fixed one of the robots 3 is regarded as the obstacle 2, and the operable-inoperable area of the moving one of the robots 3 can be set in the same procedure as in the above-described first embodiment. Thus, the description below is given on the premise that both of the robots 3 move.

That is, each of the first robot 3A and the second robot 3B moves, based on a program, inside the search area 5 with a constant pitch in a predetermined posture along the scheduled search route 6 which has been determined in advance in a lightning shape. When the first robot 3A and the second robot 3B come into contact with each other, the mutual position-posture-angle data with respect to the first robot 3A and the second robot 3B are stored in each of the robots 3 through real-time communication via a network. Thereafter, the operable-inoperable areas for each of the robots 3 are respectively set inside the search area 5 based on the position-posture-angle data.

A specific procedure for setting the operable-inoperable area of the two robots 3 is described below based on FIG. 9A and FIG. 9B. It is assumed that the first robot 3A is set at the origin of the XaYa coordinates, while the second robot 3B is set at the origin of the XbYb coordinates. Here, the XbYb coordinates are obtained through coordinate transformation in such a manner that the XaYa coordinates are parallel shifted and the resultant coordinates are rotated by 90° in the counterclockwise direction.

It is assumed that both the first robot 3A and the second robot 3B move inside the search area 5 in a predetermined posture, and the two robots 3 detect contact respectively at a certain time point T1 where the first robot 3A is positioned at the point (20, 15) in the XaYa coordinates, while concurrently the second robot 3B is positioned at the point (−8, 10) in the XbYb coordinates (refer to FIG. 9A). The signs "x" in FIG. 9A represent interference points between the robots 3 at the time point T1. At this time, the robot system 1 records the position-posture-angle data with respect to the first robot 3A and the second robot 3B. Thereafter, when the first robot 3A is positioned at this interference point, the second robot 3B is limited so as not to approach this interference point. Conversely, when the second robot 3B is positioned at this interference point, the first robot 3A is limited so as not to approach this interference point.

It is assumed that, after the two robots 3 further move, the two robots 3 detect contact respectively at another time point T2 where the first robot 3A is positioned at the point (15, 20) in the XaYa coordinates, while concurrently the second robot 3B is positioned at the point (−20, 15) in the XbYb coordinates (refer to FIG. 9B). The signs "x" in FIG. 9B represent interference points between the robots 3 at the time point T2. At this time, the robot system 1 records the position-posture-angle data with respect to the first robot 3A and the second robot 3B. Thereafter, when the first robot 3A is positioned at this interference point, the second robot 3B is limited so as not to approach this interference point. Conversely, when the second robot 3B is positioned at this interference point, the first robot 3A is limited so as not to approach this interference point.

At this time, the operable-inoperable areas of the robots 3 are set for both the first robot 3A and the second robot 3B. Both areas change as time passes even when viewed in the same coordinate system (for example, in the XaYa coordinate system).

As described above, according to the present embodiment, the operable-inoperable areas (the operable area 5a and the operation restricted area 5b) of the two robots 3 (the first robot 3A and the second robot 3B) can be automatically set inside the search area 5 upon the contact of the robots 3 with each other. This enables to reduce the burden on the setting operator regardless of conditions such as setting conditions of the two robots 3 and the complexity of a work space, at the time of setting of the operable-inoperable area.

Moreover, in the robot system 1, as shown in FIG. 9A and FIG. 9B, the operable-inoperable areas of the robots 3 are set corresponding to the movement of the interference point between the robots 3 as time passes. This, as a result, enables to keep the operation restricted area 5b minimized, so as to enable the two robots 3 to move in a wider range inside the search area 5 without the two robots 3 coming into contact with each other.

In addition, in the robot system 1, since the two robots 3 are communicatively connected to each other via a network, position-posture-angle data can be kept updated through real-time communication via a network, even in cases where each other's mutual position-posture-angle data are changed. Accordingly, usability of the robot system 1 is improved.

Other Embodiments

It is noted that the present invention includes modifications and improvements within the scope where the object of the present invention is enabled to be achieved, not being limited to the above-described embodiments.

For example, the above first, second and third embodiments have been described with respect to the case where the scheduled search route 6 of the robot 3 is formed in a lightning shape. However, the scheduled search route 6 does not necessarily need to be set in a lightning shape. Any shape may be set as long as the robot 3 passes through the entire search area. For example, a vortex shape (spiral shape) or a shape combining a lightning shape and a vortex shape can be adopted for the scheduled search route 6.

The first, second and third embodiments have also been described with respect to the case where the robot 3 moves inside the search area 5 with a constant pitch at the time of setting of the operable-inoperable area of the robot 3 inside the search area 5. Alternatively, the movement pitch of the robot 3 may be appropriately determined according to the demand reflecting how close to the outer shape of the obstacle 2 the operation restricted area 5b is to be set. Furthermore, the movement pitch of the robot 3 does not necessarily need to be made constant. In an example, the robot 3 may move with a large pitch until colliding with the obstacle 2, and may move with a small pitch after collision with the obstacle 2. This enables to efficiently and quickly set the operable-inoperable area of the robot 3, while maintaining the accuracy of detection of the obstacle 2.

The first, second and third embodiments have also been described with respect to the case where the robot 3 moves based on a program at the time of setting of the operable-inoperable area of the robot 3 inside the search area 5. However, for example, the setting operator may move the robot 3 by a so-called jog operation, by pressing a movement button on the operation panel.

The first, second and third embodiments have also been described with respect to the robot system 1 having a vertical articulated robot 3. However, the invention is similarly applicable to the robot system 1 having a different robot (for example, a horizontal articulated robot, a parallel link robot, etc.) from the vertical articulated robot 3, as long as the robot moves inside the predetermined search area 5 in predetermined posture.

The first, second and third embodiments have also been described with respect to the case where the search area 5 has a rectangle shape. However, the search area 5 is not limited to a rectangle shape and may have a planar shape other than a rectangle shape (for example, a triangle, a circle, an ellipse, etc.), or further a three-dimensional shape (for example, a rectangular parallelepiped, a cylinder, a sphere, etc.).

The first embodiment has also been described with respect to the case where the operable-inoperable area is indicated in numerical values, when the operable-inoperable area of the robot 3 is set inside the search area 5 (refer to FIG. 7). However, the operable-inoperable area of the robot 3 may be indicated in computer graphics, instead of numerical values or in addition to numerical values.

The first embodiment has also been described with respect to the robot 3 capable of specifying through calculation, by use of the 6-axis force sensor 35, which part of the mechanical portion has come into contact with the obstacle 2. However, a sheet-type contact sensor (not shown in the figures) may be attached to cover the mechanical portion of the robot 3, so that the contact sensor directly determines and specifies which part of the mechanical portion has come into contact with the obstacle 2.

The second embodiment has also been described with respect to the robot system 1 having the two robots 3 communicatively connected to each other via a network. However, the two robots 3 are not required to be communicatively connected to each other via a network if the setting operator can input the relative position-angle data with respect to the two robots 3.

The second and third embodiments have further been described with respect to the robot system 1 having the two robots 3 (the first robot 3A and the second robot 3B).

However, the present invention is similarly applicable in cases where three or more robots 3 are provided.

EXPLANATION OF REFERENCE NUMERALS

1 ROBOT SYSTEM
2 OBSTACLE (OBJECT)
3, 3A, 3B ROBOT
5 SEARCH AREA
5a OPERABLE AREA
5b OPERATION RESTRICTED AREA
6 SCHEDULED SEARCH ROUTE
7 DISPLAY DEVICE

What is claimed is:
1. A robot system comprising:
a robot capable of detecting contact with an object;
a memory configured to store a program; and
a processor configured to execute the program so as to:
  move the robot along a previously-determined scheduled search route when moving inside a predetermined search area; and
  set a contact point as a position of the robot upon the robot making contact with the object along the scheduled search route;
  cause the robot to change the scheduled search route upon the robot making contact with the object by shifting the scheduled search route by a certain distance from the contact point so as to make a route detour to avoid further contact with the object;
  cause the robot to revert to the scheduled search route after the route detour to avoid the object, wherein the robot recursively repeats the change in the scheduled search route so that the scheduled search route is modified to include the route detour on further iterations of the scheduled search route; and
  set an operable-inoperable area of the robot inside the search area based on the set contact point.
2. The robot system according to claim 1, wherein the robot specifies which part of a mechanical portion of the robot has come into contact with the object.
3. The robot system according to claim 1, wherein when the operable-inoperable area is set, the processor indicates the operable-inoperable area on a display device, and
the operable-inoperable area can be selected to be applied to the robot system and thus become effective via the display device.
4. A robot system comprising:
at least a first robot and a second robot;
a memory configured to store a program; and
a processor configured to execute the program so as to:
  move either one of the first robot and the second robot inside a predetermined search area and set an operable-inoperable area of the one robot inside the search area, based on position data with respect to the one robot having come into contact with an object during moving of the one robot, and
  set an operable-inoperable area of the other of the first robot and the second robot inside the search area through calculation, by using relative position-angle data of the one robot, based on the operable-inoperable area of the one robot.

* * * * *